United States Patent Office 3,729,320
Patented Apr. 24, 1973

3,729,320
METHOD OF NOURISHING MAMMALS
Fritz Kramer, 60—11 Broadway, Woodside, N.Y. 11377
No Drawing. Filed Oct. 8, 1970, Ser. No. 79,258
Int. Cl. A23k *1/00*
U.S. Cl. 99—9
6 Claims

ABSTRACT OF THE DISCLOSURE

Chicken manure liquefied and absorbed in a small amount of urea-formaldehyde polymer foam and thereafter incubated for fermentation and propagation of the microorganisms contained in the manure is a practically dry product, free from unpleasant odor and rich in protein of microbial origin. It is a feed supplement readily accepted and tolerated as nourishment by domestic animals, particularly ruminants.

---

This invention relates to animal nourishment, and particularly to feed for domestic animals.

Urea-formaldehyde polymer foam is a staple article of commerce which is commonly employed for thermal insulation in building construction, but has found other uses, particularly as a substrate for the growth of plants (see "Plastoponik" by Heinz Baumann, published by A. Huthig, Heidelberg, Germany).

It has also been proposed to convert manure, even chicken manure, which normally contains 80% to 90% water when fresh, into a practically odorless, humus-like substance by mixing only enough urea-formaldehyde polymer foam with the manure to absorb the water, and holding the mixture so obtained under aerobic fermentation conditions until the manure odor has substantially disappeared. When this product is dried to a water content of 40%, it is practically free-flowing and is a good fertilizer and soil conditioner.

Typically, the afore-described product contains, on a dry basis, one quarter ash and three quarters organic matter by weight. Elementary analysis shows approximately 15% assimilable nitrogen, 5% $P_2O_5$, 2% $K_2O$, 5% CaO, and 0.7% MgO.

I have now found that this fertilizer or soil conditioner material is edible to domestic animals, does not produce disease, and can replace other protein supplements in the animals' diet.

The following example illustrates the manner in which the afore-mentioned soil conditioner and fertilizer may be prepared, and its use as a feed supplement for domestic animals.

EXAMPLE

Urea-formaldehyde resin foam was prepared in an apparatus of the type disclosed in Bauer Patent No. 2,860,856 by mixing in a nozzle a 32% aqueous solution of urea-formaldehyde precondensate (mole ratio 1:2) with an aqueous solution of 9% Nacconol SZA, a surfactant of the sodium alkylarylsulfonate type, and 1% phosphoric acid at a ratio of 10 parts resin solution and 9 parts acidified surfactant solution. The mixture was discharged from the nozzle by means of compressed air dispersed in the mixture at an initial pressure of 65 p.s.i. The stream of discharged foam was permitted to settle on a horizontal surface where mounds of foam quickly solidified. They lost some of their initial water content by air drying. When in moisture equilibrium with the ambient air, the foam had a bulk density of 10 grams per liter.

It was shredded on a silage shredder to a particle size of 1–2 cm. and transferred to a bin. Chicken manure collected in a henhouse was liquefied by ultrasonic agitation and added to the shredded plastic foam in the bin in a volume ratio of 1:3. The manure was so completely absorbed in the foam material that the combined bulk of the foam and of the manure was not measurably greater than that of the plastic foam prior to addition of the manure. The contents of the bin formed a stiff sludge, containing almost 80% water, but resembling a solid more than a liquid.

The sludge was stored at an ambient temperature of about 30° C. in open, perforated boxes filled to a depth of 60 cm. and holding one ton of material each. The boxes were held in a well ventilated chamber, and the air pumped into the chamber carrier away gaseous fermentation products and enough of the heat of the fermentation taking place in the boxes to keep the fermenting material at temperatures usually not exceeding 60° C. The air was dry enough to remove water from the fermentation mixture by evaporation.

The chamber was opened and the boxes were removed after eight days when the thermal energy of fermentation became insufficient to maintain a temperature of the mixture higher than that of the air supplied. The product had the composition indicated above and contained 211 millions of single-cell microorganisms per gram on a dry basis. Microscopic inspection also showed that the microorganisms and manure solids present were almost entirely contained in the voids of the foam which communicated with each other and with the ambient atmosphere mainly through capillary ducts in the walls of the plastic. The foam appeared unchanged by the fermentation.

Ten Cheviot sheep have been fed the mixture of fermented chicken manure and urea formaldehyde foam beginning several weeks prior to the filing of this application as replacement for varying portions of the grain supplement in their diet. They readily accepted the modified feed, and did not show any ill effects from the feed material of this invention by the time of execution of this application. Limited tests indicate that an admixture of 10% of the manure-derived material to their feed is also acceptable to other domestic animals including chicken, ducks, pigs, goats, cattle, and horses.

As far as is known, urea-formaldehyde polymer is not digestible by any warm-blooded animal, and probably passes unchanged through the digestive tract as roughage which is readily tolerated because of its friability, chemical inertness, and small particle size. It is thought mainly to act as a carrier for the fermentable manure solids and for the microorganisms which proliferate in the manure under aerobic conditions and at temperatures of at least 15° C., but not much more than 60° C. The fementation stops when the temperature is permitted to rise beyond this limit for a significant time, and cannot be started again by lowering the temperature, thus indicating that the microorganisms are inactivated at elevated temperature.

Freshly prepared urea-formaldehyde polymer foam contains small amounts of free formaldehyde which apparently do not interfere with microbial growth, perhaps because of the formation of Schiff's bases with ammonia and amines present in the manure.

The fermentation starts spontaneously when the manure is held in the presence of the plastic foam at a temperature of at least 15° C. It is not known at this time whether the microorganisms originate from the digestive tract of the chicken or from accidental contamination from ambient air including the air employed for cooling and aeration.

The temperature and relative humidity of the air supplied during the fermentation process have no apparent bearing on the fermentation product except on its moisture content, and a fermentation product containing as much water as the original mixture of manure and plastic foam, that is, approximately 80%, is entirely acceptable for the purpose of this invention. Drying to a moisture content as low as 20% unnecessarily increases the cost of the feed material, but does not affect its acceptability by the animals tested, nor have side effects on the animals been observed.

The amount of urea-formaldehyde resin foam added to the liquid manure is not critical, but nothing useful is achieved by adding more than the amount necessary to convert the liquid manure to a paste capable of being handled as a solid. This amount is readily determined by visual examination of the mixture and is of the order of 1 to 5 percent of the weight of the manure on a dry basis.

The apparent absence of pathogenic microorganisms in the feed material is surprising and not yet entirely understood. It is thought that the conditions which cause spontaneous subsiding of the fermentation destroy the viability of most of the microorganisms present, and that those surviving cannot produce diseases when ingested by animals.

What is claimed is:

1. A method of nourishing an animal which comprises feeding to said animal the product obtained by fermenting manure in the presence of a small amount of particulate urea-formaldehyde resin foam mixed with said manure, the amount of said foam being sufficient to make the mixture capable of being handled as a soft solid when containing approximately 80 percent water, said manure being fermented under aerobic conditions for a time sufficient substantially to eliminate the manure odor of the mixture.

2. A method as set forth in claim 1, wherein said manure is fermented at a temperature which manure does not exceed 60° C. for a significant period of time, and until fermentation of said mixture subsides spontaneously.

3. A method as set forth in claim 2, wherein said manure is chicken manure.

4. A method as set forth in claim 1, wherein said animal is a ruminant.

5. A method as set forth in claim 3, wherein said animal is a sheep.

6. A method as set forth in claim 2, wherein the amount of said foam is approximately 1 to 5 percent by weight of said mixture on a dry basis.

References Cited

UNITED STATES PATENTS

| | | | |
|---|---|---|---|
| 3,331,676 | 7/1967 | Roblin | 71—21 |
| 2,766,283 | 10/1956 | Darden | 99—2 |
| 2,750,269 | 6/1956 | Klein | 71—21 |

FOREIGN PATENTS

| | | | |
|---|---|---|---|
| 822,683 | 10/1959 | Great Britain | 71—9 |

OTHER REFERENCES

"Feedstuffs," Jan. 10, 1970, p. 18, vol. 42, No. 2.

"Hanna's Handbook of Agricultural Chemicals," 1958, p. 384, Lester W. Hanna, Rt. 1, Box 210, Forest Grove, Oreg.

A. LOUIS MONACELL, Primary Examiner

R. M. ELLIOTT, Assistant Examiner